(No Model.)

G. LOFGREN.
WAVE AND CURRENT MOTOR.

No. 604,211. Patented May 17, 1898.

Witnesses,

Inventor
Gustaf Lofgren
By Dewey & Co.

UNITED STATES PATENT OFFICE.

GUSTAF LOFGREN, OF NEWARK, CALIFORNIA.

WAVE OR CURRENT MOTOR.

SPECIFICATION forming part of Letters Patent No. 604,211, dated May 17, 1898.

Application filed December 3, 1897. Serial No. 660,663. (No model.)

*To all whom it may concern:*

Be it known that I, GUSTAF LOFGREN, a citizen of the United States, residing at Newark, county of Alameda, State of California, have invented an Improvement in Wave or Current Motors; and I hereby declare the following to be a full, clear, and exact description of the same.

My invention relates to a novel means for applying both the forward and return force of waves or the force of a current running continuously in one direction for the propulsion of machinery.

It consists, essentially, of a series of vertically-adjustable shafts having paddles or floats fixed to them, diagonally-disposed sluices, the sides of which are so arranged with reference to the floats that the influx of water in one direction will strike the floats upon one side of the central shaft and cause them to rotate, and the return or reflex wave or current will be so directed as to strike the floats upon the opposite side and cause them to rotate continuously in the same direction.

It also consists in details of construction, which will be more fully explained by reference to the accompanying drawings, in which—

Figure 1:
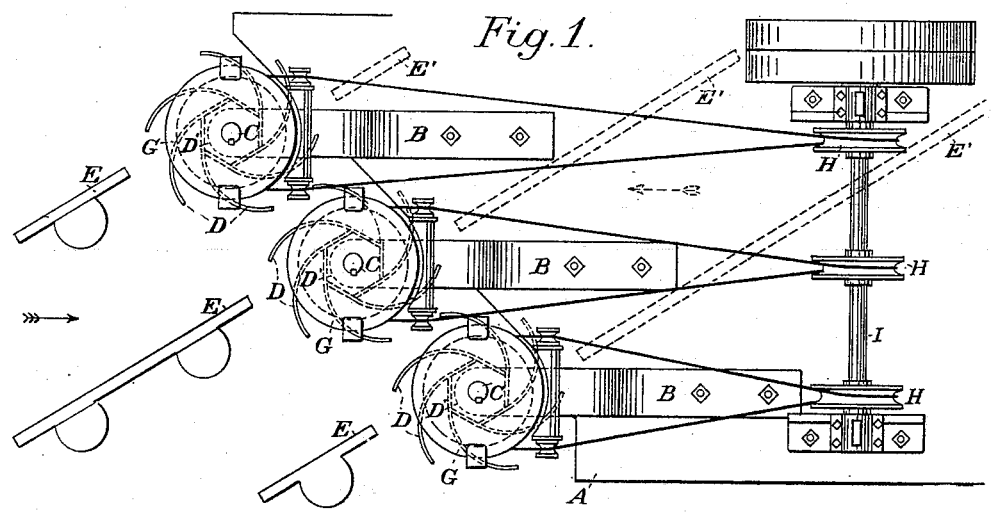
Figure 2:
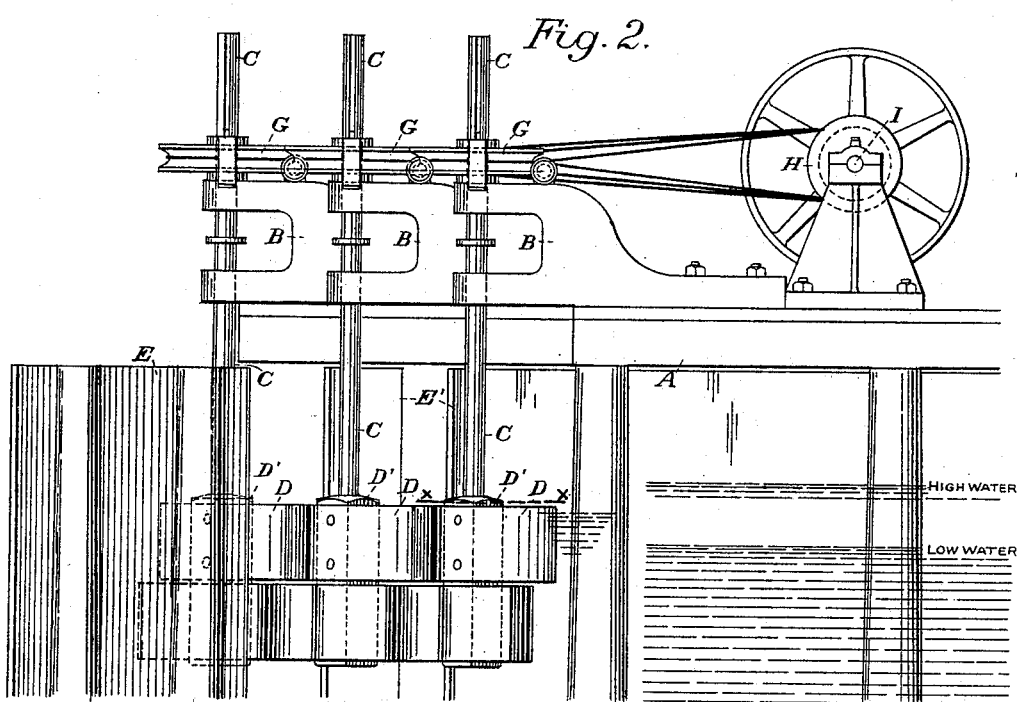
Figure 3:
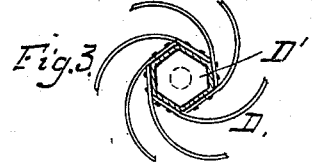

Figure 1 is a plan. Fig. 2 is an elevation. Fig. 3 is a cross-section of one of the floats D' and its paddles on the line *x x* of Fig. 2.

Various arrangements may be made of my device. In the present case I have shown a wharf or supporting structure A, having at the outer end a series of supports B, in which are journals for the vertical shafts C. Upon the lower ends of these shafts and so disposed as to be essentially within the line of movement of the water are the floats or paddles D, which may be preferably curved, as shown in the present case. These wheels and shafts and their supporting journal-boxes are so disposed that they may be raised or depressed to suit the condition of the tide, so that they will always be sufficiently exposed to receive the action of waves or swell passing them from the highest to the lowest tide. This adjustment may be made in various ways. In the present case I have shown the floats D' hollow and of sufficient diameter and depth to float and sustain the paddles sufficiently submerged. These floats are slidable up and down upon the shafts C and are prevented from turning around on the shafts by vertical feathers. The floats are shown as hexagonal in cross-section to accord a convenient means for securing the paddles to them.

In order to properly direct the inflowing tide, I have shown a guiding-channel formed by suitably-constructed bulkheads E, which stand, preferably, as here shown, in diagonal lines, and they are so disposed as to direct the inward flow of the water against the paddles or floats at one side of the center. The diagonal disposition of the guides serves to prevent the water striking the opposite sides of the wheels with any degree of force and the impulse will be directed to rotating the wheels in one direction.

I have here shown the wheels and their shafts arranged in series diagonally to the line in which the waves approach, so that they are situated in planes one behind another from the first to the last of the wheels. When the wave has expended its force and is returning, it strikes another series of guides E', which are fixed correspondingly upon the opposite or shore side of the wheels and serve to direct the returning water upon the opposite side of the wheels from that which receives the inflow. Thus the returning wave acts upon the wheels to continue the rotation in the same direction and the movement is made more nearly continuous. Various devices may be employed for transmitting the power thus produced. In the present case I have shown wheels or drums G, around which pass ropes, chains, or flexible belts of any description, and these may change their direction, so as to pass over the horizontally-journaled pulleys H upon a shaft I, through which power is to be transmitted. The distance from the point where the wheels are situated to the counter-shaft I may be as great as circumstances require and as the ability to transmit the power will admit.

Gear-wheels or other well-known means for transmitting power may be substituted for belt or chain driving devices.

The device is exceedingly simple and effective for the purpose required and is also comparatively inexpensive. It may be mounted upon a floating structure as well as upon a permanent one and may also be used where there is a current in one direction.

Having thus described my invention, what I claim as new, and desire to secure by Letters Patent, is—

1. In a wave-power motor, a paddle-wheel fixed upon the lower end of a vertically-journaled shaft and connected with a float whereby it may be moved vertically to conform to the movements of the tide, a structure by which said shaft is supported and means whereby the inflow and reflex waves are directed upon opposite sides of the center of the paddle-wheel.

2. In a wave-power motor, paddle-wheels arranged in series diagonally to the line in which the waves approach, vertically-disposed shafts upon the lower ends of which the wheels are mounted and means whereby the wheels may rise and fall with the tide, a supporting structure for the upper portions of the shafts and diagonally-disposed channels in front of and behind the wheels whereby the inflowing and outflowing movements of the waves are directed upon opposite sides of the center of the wheels to produce a continuous movement of the wheels in one direction.

3. In a wave-power motor, vertically-journaled shafts mounted upon a supporting structure, paddle-wheels fixed at the lower ends of said shafts and dipping into the water, diagonally-disposed guiding sluices or channels whereby the inflowing waves are directed upon one side of the wheels, and the returning waves are directed upon the opposite side and a means whereby the wheels and shafts may be raised and depressed to suit the condition of the tide.

4. In a wave-power motor, a series of vertically-journaled shafts, a structure upon which they are supported in a line diagonal to the line of movement of the waves, paddle-wheels fixed upon the lower ends of said shafts to dip into the water, diagonally-disposed channels or chutes so fixed with relation to the wheels and the line of movement of the waves that the inflowing wave is directed against one side of the wheel and the outflowing wave against the opposite side to produce an approximately continuous motion in one direction, transmitting mechanism fixed to the upper ends of the shafts and connecting said wheel-shafts with a counter-shaft through which the power is transmitted.

In witness whereof I have hereunto set my hand.

GUSTAF LOFGREN.

Witnesses:
S. H. NOURSE,
JESSIE C. BRODIE.